United States Patent
Shelton et al.

(10) Patent No.: US 9,847,796 B2
(45) Date of Patent: *Dec. 19, 2017

(54) MULTIBAND WIRELESS DATA TRANSMISSION BETWEEN AIRCRAFT AND GROUND SYSTEMS BASED ON AVAILABILITY OF THE GROUND SYSTEMS

(71) Applicant: The Boeing Company, Chicago, IL (US)

(72) Inventors: Jason W. Shelton, Edgewood, WA (US); Timothy M. Mitchell, Seattle, WA (US); Daniel Nguyen, Auburn, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/516,659

(22) Filed: Oct. 17, 2014

(65) Prior Publication Data

US 2016/0112071 A1    Apr. 21, 2016

(51) Int. Cl.
*H04B 1/00* (2006.01)
*H04B 1/3822* (2015.01)

(52) U.S. Cl.
CPC ......... *H04B 1/0057* (2013.01); *H04B 1/3822* (2013.01)

(58) Field of Classification Search
CPC ........................... H04B 1/0057; H04B 1/3822
(Continued)

(56) References Cited

U.S. PATENT DOCUMENTS 6,690,922 B1 * 2/2004 Lindemann .......... H03G 3/3047
                                                    455/522
6,995,658 B2    2/2006 Tustison et al.
(Continued)

FOREIGN PATENT DOCUMENTS

EP      2161855 A1    3/2010
EP      2632060 A1    8/2013

OTHER PUBLICATIONS

Kumar, et al., "Secure Aircraft Data Transmission Using Multiple Communication Channels", U.S. Appl. No. 14/166,708, filed Jan. 28, 2014, 40 pgs.
(Continued)

*Primary Examiner* — Mark Rinehart
*Assistant Examiner* — Peter G Solinsky
(74) *Attorney, Agent, or Firm* — Kwan & Olynick LLP

(57) ABSTRACT

Provided are methods and systems for multiband wireless data transmission between aircraft and ground systems. The transmission uses different wavelength ranges, each wavelength range corresponding to a different data domain and establishing a different communication channel. This wavelength differentiation provides physical separation between different data domains and, as a result, improves data security. Furthermore, a single broadband antenna is used on the exterior of the aircraft for transmitting data sets from different data domains. The single antenna configuration reduces drag and weight and improves structural integrity of the aircraft in comparison to multi-antenna configurations. Different aircraft communication modules, which are connected to different aircraft systems, handle different data domains and operate at different wavelength ranges. These modules are connected to the same antenna using a multiplexer. This connection may be controlled using gate devices
(Continued)

and may be conditioned on verification of communication channel availability, security status, and other factors.

20 Claims, 9 Drawing Sheets

(58) Field of Classification Search
USPC .......................................................... 370/338
See application file for complete search history.

(56) References Cited

U.S. PATENT DOCUMENTS

| | | | |
|---|---|---|---|
| 7,146,147 B1* | 12/2006 | Sabatino | H04B 1/1009 343/705 |
| 7,720,442 B2* | 5/2010 | McGuffin | G01R 29/10 455/115.1 |
| 7,893,557 B2 | 2/2011 | Davis et al. | |
| 9,667,338 B2* | 5/2017 | Shelton | H04B 7/18506 |
| 2003/0067542 A1* | 4/2003 | Monroe | H04N 7/181 348/148 |
| 2003/0181229 A1* | 9/2003 | Forster | G06K 19/0723 455/575.7 |
| 2006/0030311 A1 | 2/2006 | Cruz et al. | |
| 2006/0077887 A1 | 4/2006 | Roh et al. | |
| 2006/0229077 A1 | 10/2006 | Monk | |
| 2007/0120679 A1* | 5/2007 | Shin | G06K 7/0008 340/572.7 |
| 2007/0297320 A1* | 12/2007 | Brummette | F42D 5/04 370/208 |
| 2008/0085691 A1* | 4/2008 | Harvey | H04B 7/18508 455/187.1 |
| 2008/0102813 A1 | 5/2008 | Chari et al. | |
| 2008/0122717 A1* | 5/2008 | Su | H01Q 1/38 343/787 |
| 2009/0133112 A1* | 5/2009 | Kauffman | G08G 5/0013 726/11 |
| 2010/0054347 A1* | 3/2010 | Schuller | G08C 19/34 375/259 |
| 2010/0109955 A1* | 5/2010 | Anguera | H01Q 1/243 343/702 |
| 2011/0002297 A1* | 1/2011 | Jain | H04L 12/66 370/331 |
| 2011/0096770 A1* | 4/2011 | Henry | H04W 36/00 370/352 |
| 2011/0182230 A1* | 7/2011 | Ohm | H04B 7/185 370/315 |
| 2011/0216734 A1* | 9/2011 | Yu | H04J 11/00 370/330 |
| 2012/0099627 A1 | 4/2012 | Mitchell et al. | |
| 2012/0243638 A1* | 9/2012 | Maltsev | H04W 72/0453 375/316 |
| 2012/0303183 A1* | 11/2012 | Fischer | H04L 47/805 701/3 |
| 2012/0320782 A1* | 12/2012 | Seo | H04L 1/1854 370/252 |
| 2013/0003756 A1 | 1/2013 | Mitchell et al. | |
| 2013/0282907 A1* | 10/2013 | Kim | H04L 41/08 709/226 |
| 2014/0122607 A1* | 5/2014 | Fodor | H04W 76/023 709/204 |
| 2014/0164761 A1* | 6/2014 | Kufluk | H04L 63/10 713/155 |
| 2014/0241334 A1* | 8/2014 | Martin | H04W 4/22 370/338 |
| 2014/0254693 A1 | 9/2014 | Mitchell et al. | |
| 2014/0274111 A1* | 9/2014 | Edge | H04W 4/023 455/456.1 |
| 2014/0327577 A1* | 11/2014 | Ozaki | H01Q 3/26 342/367 |
| 2015/0029333 A1 | 1/2015 | Ko et al. | |
| 2015/0103806 A1* | 4/2015 | Kuusilinna | H04W 64/00 370/332 |
| 2015/0105120 A1* | 4/2015 | Lim | H04W 36/0022 455/552.1 |
| 2015/0116168 A1* | 4/2015 | Yosui | H01Q 7/00 343/722 |
| 2015/0180977 A1* | 6/2015 | Riedel | H04L 67/12 715/719 |
| 2015/0257165 A1* | 9/2015 | Gale | H04B 1/1036 370/329 |
| 2015/0312719 A1* | 10/2015 | Cho | H04W 64/003 455/456.5 |
| 2016/0021512 A1* | 1/2016 | Krallman | H04W 24/10 455/456.3 |
| 2016/0029333 A1* | 1/2016 | Seo | H04L 27/2655 370/350 |
| 2016/0037520 A1* | 2/2016 | Wang | H04W 72/0453 370/329 |
| 2016/0057565 A1* | 2/2016 | Gold | H04W 4/008 455/41.1 |
| 2016/0095002 A1* | 3/2016 | Zhan | H04B 7/15557 370/294 |
| 2016/0285505 A1* | 9/2016 | Lee | H04B 1/62 |
| 2016/0344467 A1 | 11/2016 | Shelton et al. | |

OTHER PUBLICATIONS

Nguyen, et al., "Aircraft Data Transmission Using Phase Separation", U.S. Appl. No. 13/897,243, filed May 17, 2013, 43 pgs.

"European Application No, 15190118.8, Search Report dated Mar. 29, 2016", 7 pgs.

Shelton, Jason W., "Multiband Wreless Data Transmission Between Aircraft and Ground Systems", U.S. Appl. No. 14/516,668, filed Oct. 17, 2014, 47 pgs.

"U.S. Appl. No. 14/516,668, Non Final Office Action dated Sep. 28, 2016", 9 pages.

"U.S. Appl. No. 14/516,668, Notice of Allowance dated Jan. 27, 2017", 8 pages.

* cited by examiner

MULTIBAND WIRELESS DATA TRANSMISSION BETWEEN AIRCRAFT AND GROUND SYSTEMS BASED ON AVAILABILITY OF THE GROUND SYSTEMS

BACKGROUND

The amount of data stored, collected, and used by various onboard systems of modern aircraft is growing at a rapid pace. These systems may support data for cabin operations, avionics operations, and inflight entertainment. Furthermore, operational and maintenance data as well as engine performance data may be generated during a typical flight and needed to be transferred to ground systems upon landing. Airlines are generally responsible for updating data and configuring software on their aircraft (e.g., for flight operations and passenger entertainment) as well as for timely downloading various data from their aircraft (e.g., maintenance and system performance logs). All these activities require fast and secure data transmission between aircraft and ground systems while the aircraft is at the airport, for example, in between its flights. The security levels of some communication channels available at airports are often low, which may lead to security breaches and may impact the data at the aircraft, including various mission critical data.

SUMMARY

Provided are methods and systems for multiband wireless data transmission using different communication channels, such as WiFi, WiMAX, cellular, and SatCom, between aircraft and ground systems. The transmission may use different wavelength ranges such that each wavelength range corresponds to a different data domain and establishes a different communication channel. This wavelength differentiation provides physical separation between different data domains and, as a result, improves security. Furthermore, a single broadband antenna is used on the exterior of the aircraft for transmitting data sets from different data domains. The single antenna configuration reduces drag and weight and improves structural integrity of the aircraft in comparison to multi-antenna configurations. At the same time positioning the antenna on the exterior of the aircraft provides an increased data transmission in comparison to antennas positioned inside the aircraft. Different aircraft communication modules, which are connected to different aircraft systems, handle establishing different communication channels and transmission of different data domains, each using a different wavelength ranges. These modules are connected to the same antenna using a multiplexer. This connection may be controlled using gate devices and may be conditioned on verification of communication channel availability, security status, and other factors. In some embodiments, a separate data set may be used for controlling communication in one or more communication channels.

In some embodiments, a method for multiband wireless data transmission between an aircraft and one or more ground systems comprises receiving a first data set at a first aircraft communication module for transmission to a first ground system. The method proceeds with generating an RF signal using the first aircraft communication module. The first RF signal is provided to a multiplexer connected to an aircraft broadband antenna positioned on the exterior of the aircraft. The method involves transmitting the first RF signal from the aircraft broadband antenna to the first ground systems. The method proceeds with receiving a second data set at a second aircraft communication module for transmission to a second ground system and generating a second RF signal using the second aircraft communication module. The second RF signal is also provided to the multiplexer. The method proceeds with transmitting the second RF signal from the aircraft broadband antenna to the second ground system. The wavelength range of the first RF signal is different from the wavelength range of the second RF signal. In some embodiments, the wavelength range of the first RF signal does not overlap with the wavelength range of the second RF signal.

In some embodiments, transmitting the first RF signal at least partially overlaps in time with transmitting the second RF signal. Specifically, the first RF signal and the second RF signal may be transmitted at the same time (e.g., at least for some period of time). This feature further reflects the physical separation aspect between the first data domain and the second data domain even during RF signal transmission representing data sets from these data domains.

In some embodiments, the method also involves checking a first RF energy at the aircraft broadband antenna. The first RF energy corresponds to the wavelength range of the first RF signal. The first RF energy is generated using a first ground antenna of the first ground system. This checking operation is performed prior to transmitting the first RF signal. Furthermore, transmitting the first RF signal may be conditioned on the first RF energy being within a certain range, e.g., first range. If the first RF energy is not within this range, then the first RF signal is not transmitted. The checking may be performed based on information available to the aircraft about the current location of the aircraft, e.g., availability of ground systems in a current aircraft. In some embodiments, the first aircraft communication module is connected to the multiplexer using a gate device. The gate device may be operable to connect the first aircraft communication module to the multiplexer or to disconnect the first aircraft communication module from the multiplexer depending on the first RF energy being within the first range. The method may also involve checking RF energy at the aircraft broadband antenna for other communication channels or, in specific embodiments, for all channels. For example, the method may involve checking a second RF energy at the aircraft broadband antenna. The second RF energy corresponds to the wavelength range of the second RF signal. The second RF energy is generated using a second ground antenna of the second ground system. This checking operation is performed prior to transmitting the second RF signal.

In some embodiments, the first ground antenna is different form the second ground antenna. For example, the first ground antenna may be a WiFi antenna, while the second ground antenna may be a WiMAX antenna, a cellular antenna, or a SatCom antenna. More specifically, the first ground antenna may be a WiMAX antenna, while the second ground antenna may be a SatCom antenna. Alternatively, the first RF signal and the second RF signal may be transmitted to the same ground antenna, e.g., a ground antenna. In some embodiments, the aircraft broadband antenna is configured to transmit with a wavelength range of between about 10 kHz and 60 GHz or, more specifically, between about 700 MHz and 6 GHz. This range includes multiple sub-ranges independently used by different aircraft communication modules.

The data sets transferred from aircraft to the first and second ground systems may belong to different data domains and may be received by the aircraft communication modules from different aircraft systems, e.g., different from each other and from the aircraft communication system including the aircraft communication modules, multiplexer, and other components. For example, the first data set may be received from an aircraft control system, while the second data set may be received from one of an airline information services system or a passenger information and entertainment services system. These aircraft systems may be communicatively separated. That is a data set of one aircraft system is not accessible by another aircraft system and vice versa. More specifically, the aircraft systems may be physically separated. The physical separate includes communicative separation between the aircraft systems. As such, if, for example, the security of the passenger information and entertainment services system is breached, this breach will not impact the aircraft control system.

In some embodiments, the method also involves receiving a third data set. The third data set may indicate the current availability of the first ground system or, more specifically, of the first ground antenna of the first ground system within the operating range of the aircraft broadband antenna. The transmission of the first RF signal may be conditioned on this availability. If the third data set indicates that the first ground system is not available, then the first RF signal is not transmitted. Alternatively, if the third data set indicates that the first system is available, then the first RF signal is transmitted to the first antenna. In some embodiments, the third data set may be received at the second aircraft communication module. This second module may control a gate device, which is operable to form or break connection between the first aircraft communication module and multiplexer. Even though the second aircraft communication module controls the gate device in the first communication channel (i.e., the channel handled by the first aircraft communication module), the first and second communication channels remain physically separated. This control feature may be also referred to as cross-checking since the data transmitted using one channel (e.g., the second communication channel in the above example) is used to control communication in another channel (e.g., the first communication channel).

In some embodiments, the method involves receiving a fourth data set. The fourth data set may indicate the current security status within the operating range aircraft broadband antenna. For example, an airport may have different levels of security that are assigned on various factors, current threats, previous threats, and the like. In this example, transmitting the first RF signal may be conditioned on this security status. This feature may be also implemented as a cross-checking feature, such that the fourth data set is received by the second aircraft communication module and may be used to control the first communication channel by either connecting or disconnecting the first aircraft communication module from the multiplexer.

In some embodiments, transmitting the first RF signal is conditioned on availability of the first ground system in the present location of the aircraft. The availability of the first ground system (and, in some embodiments, of other ground system) may be provided from a communication database. This information may be updated after establishing one of or more communication channels.

In some embodiments, the first aircraft communication module is not operable within the wavelength range of the second RF signal. Likewise, the second aircraft communication module may not be operable within the wavelength range of the first RF signal. This feature also ensures physical separation between data domain and communication channels.

Provided also is a system for multiband wireless data transmission between an aircraft and one or more ground systems. The system may include a first aircraft communication module configured to operate within a first wavelength operating range. The system may also include a second aircraft communication module configured to operate within a second wavelength operating range. The second wavelength operating range may not overlap with the first wavelength operating range. The system may include a multiplexer connected to the first aircraft communication module and to the second aircraft communication module. The multiplexer may be configured to combine RF signals from the first aircraft communication module in the first wavelength operating range and from the second aircraft communication module in the second wavelength operating range. The system may include a broadband antenna positioned on the exterior of the aircraft. The broadband antenna may be connected to the multiplexer and configured to transmit the RF signals in the first wavelength operating range and the second wavelength operating range to the one or more ground systems.

The system may also include a communication database having multiple data sets. Each data set includes a first range for RF energy in the first wavelength operating range and a second range for RF energy in the second wavelength operating range. Each of the multiple data sets corresponds to a different airport. For example, when an aircraft arrives a particular airport, a corresponding data set is retrieved and used by the aircraft communication system to form communication channels or not. For example, a data set may be used to control operation of gate devices between each aircraft communication module and multiplexer.

In some embodiments, the system is a part of an aircraft. Specifically, the first aircraft communication module, the second aircraft communication module, and the multiplexer may be fixedly attached to the aircraft. The aircraft also includes an aircraft control system, airline information services system, and passenger information and entertainment services system. At least one of the aircraft control system, the airline information services system, and the passenger information and entertainment services system is communicatively coupled to the first aircraft communication module. A different one of the aircraft control system, the airline information services system, and the passenger information and entertainment services system is communicatively coupled to the second aircraft communication module.

Also provided is a computer program product, comprising a computer usable medium having a computer readable program code embodied therein. The computer readable program code adapted to be executed to implement a method for multiband wireless data transmission between an aircraft and one or more ground systems. The method involves receiving a first set at a first aircraft communication module for transmission to a first ground system. The method proceeds with generating a first RF signal based on the first data set using the first aircraft communication module. The first RF signal is provided to a multiplexer, which is connected to an aircraft broadband antenna. This antenna may be positioned on the exterior of the aircraft. The method involves transmitting the first RF signal from the aircraft broadband antenna to the first ground system. The method proceeds with receiving a second data set at a second aircraft communication module for transmission to a second ground system. The method also involves generating a second RF signal based on the second data set using the second aircraft communication module. The second RF signal is also provided to the multiplexer. The method proceeds with transmitting the second RF signal from the aircraft broadband antenna to the second ground antenna. The wavelength range of the first RF signal is different from the wavelength range of the second RF signal. In some embodiments, the wavelength range of the first RF signal does not overlap with the wavelength range of the second RF signal.

In some embodiments, a method for multiband wireless data transmission between an aircraft and one or more ground systems involves determining availability of a first ground system. The method proceeds with receiving a first data set at a first aircraft communication module and generating a first radio frequency (RF) signal based on the first data set. The first RF signal is generated using the first aircraft communication module. The first RF signal is then sent to a multiplexer connected to an aircraft broadband antenna positioned on an exterior of the aircraft, if the first ground system is available. If the ground system is not available, then the first RF signal is not sent to the multiplexer. In fact, the multiplexer may be disconnected from the first aircraft communication module, if the ground system is not available. The method may proceed with transmitting the first RF signal using the aircraft broadband antenna to the first ground system if the first RF signal is sent to the multiplexer. In some embodiments, the method also involves receiving a second data set at a second aircraft communication module, generating a second RF signal based on the second data set, sending the second RF signal to the multiplexer, and transmitting the second RF signal using the aircraft broadband antenna to a second ground system. The second RF signal is generated using a second aircraft communication module. The wavelength range of the first RF signal may be different from the wavelength range of the second RF signal.

In some embodiments, determining availability of the first ground system involves receiving a third data set. The third data set includes information about availability of the first ground system in a current location of the aircraft. The third data set may be received by the second aircraft communication module, a gate device, or some other device operable to control the first communication channel corresponding to the first aircraft communication module and the first ground system. The third data set may be received from a communication database of the aircraft. For example, the communication database may include availability ground systems in one or more aircrafts that the aircraft travels to. In some embodiments, the third data set may be received by the second aircraft communication module from the second ground system based while the aircraft is in the current location. The third data set may be used to control a connection between the first aircraft communication module and the multiplexer. The third data set is used to control operation of a first gate device connecting the first aircraft communication module and the multiplexer. The third data set may be used for selecting information for the first data set. For example, the third data set may indicate that the first ground system is available, but it may also indicate that the first ground system is subject to security risk (e.g., other ground systems in this aircraft location are available, general security warning, and the like). This information may be used to select a subset of data for the first data set. In other words, not all information is transferred when the first ground system is subject to security risk. Furthermore, the third data set may include an encryption key for encrypting information of the first data set. In this case, the third data set may be received by the first aircraft communication module.

In some embodiments, if the first ground system is not available, the method proceeds with sending a fourth data set to the second ground communication module. The fourth data set indicates that the first ground system is not available. In this case, the second ground system is made aware of unavailability of the first ground system.

In some embodiments, the wavelength range of the first RF signal does not overlap with the wavelength range of the second RF signal. Transmitting the first RF signal may at least partially overlap in time with transmitting the second RF signal. The antenna of the first ground system is a WiFi antenna, while the antenna of the second ground system is a WiMAX antenna, a cellular antenna, or a SatCom. In some embodiments, the first data set is received from a first aircraft system, while the second data set is received from a second aircraft system. The first aircraft system and the second aircraft system may be communicatively separated or, more specifically, may be physically separated. The first aircraft system may be an aircraft control system, while the second aircraft system may be one of an airline information services system or a passenger information and entertainment services system. In some embodiments, the first aircraft communication module is not operable within the wavelength range of the second RF signal. Likewise, the second aircraft communication module is not operable within the wavelength range of the first RF signal.

In some embodiments, a system for multiband wireless data transmission between an aircraft and one or more ground systems includes a first aircraft communication module configured to operate within a first wavelength operating range, a second aircraft communication module configured to operate within a second wavelength operating range, a communication database comprising availability of ground systems in multiple locations, a multiplexer connected to the first aircraft communication module and to the second aircraft communication module, and a broadband antenna positioned on exterior of the aircraft. The second wavelength operating range does not overlap with the first wavelength operating range. The multiplexer is configured to combine RF signals from the first aircraft communication module in the first wavelength operating range and from the second aircraft communication module in the second wavelength operating range. The broadband antenna is connected to the multiplexer and configured to transmit the RF signals in the first wavelength operating range and the second wavelength operating range. The communication database is configured to be updated by the first aircraft communication module. In some embodiments, the first aircraft communication module is connected to a first aircraft system, while the second aircraft communication module is connected to the second aircraft system. The first aircraft system and the second aircraft system may be communicatively separated or, more specifically, physically separated.

In some embodiments, provided is a computer program product including a computer usable medium having a computer readable program code embodied therein. The computer readable program code is adapted to be executed to implement a method for multiband wireless data transmission between an aircraft and one or more ground systems. The method involving determining availability of a first ground system, receiving a first data set at a first aircraft communication module, generating a first RF signal based on the first data set (such that the first RF signal is generated using the first aircraft communication module), sending the first RF signal to a multiplexer connected to an aircraft broadband antenna positioned on an exterior of the aircraft if the first ground system is available, transmitting the first RF signal using the aircraft broadband antenna to the first ground system if the first RF signal is sent to the multiplexer, receiving a second data set at a second aircraft communication module, generating a second RF signal based on the second data set (such that the second RF signal is generated using a second aircraft communication module); sending the second RF signal to the multiplexer, and transmitting the second RF signal using the aircraft broadband antenna to a second ground system. The wavelength range of the first RF signal may be different from the wavelength range of the second RF signal.

These and other embodiments are described further below with reference to the figures.

DETAILED DESCRIPTION OF EXAMPLE EMBODIMENTS

Figure 1:
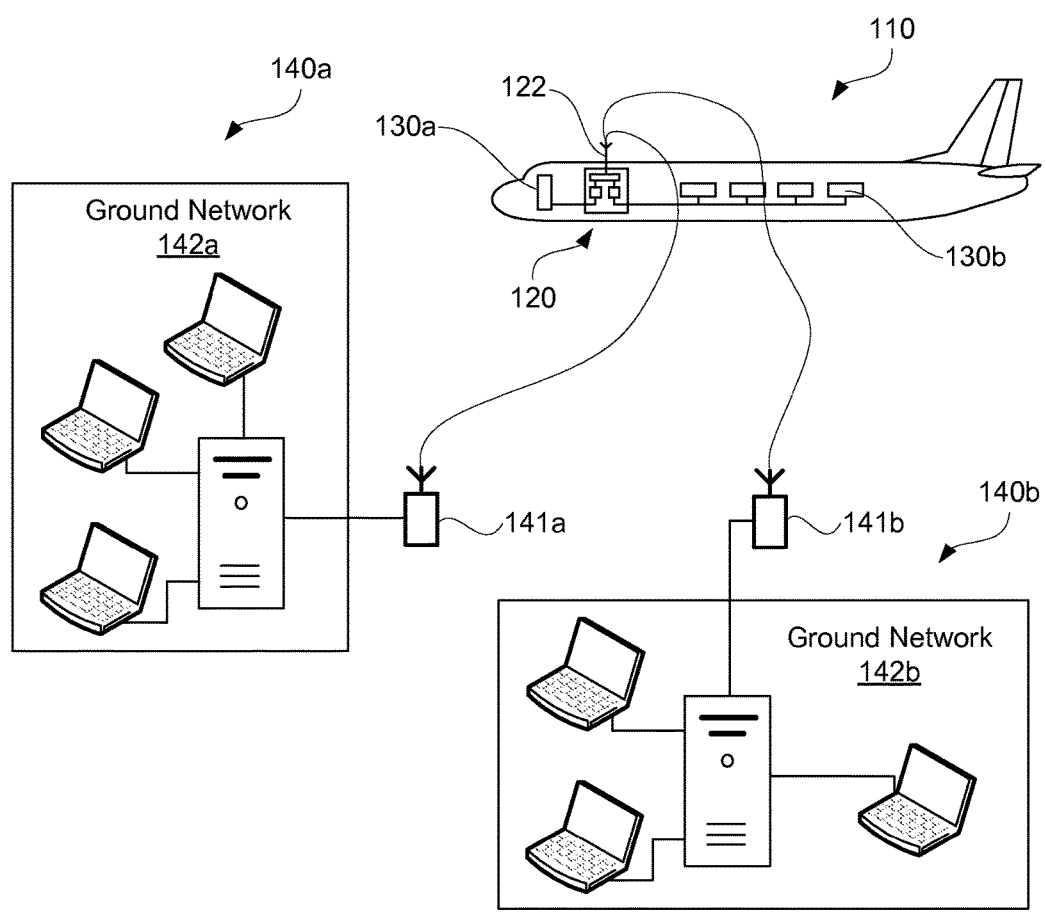
FIG. 1 is a schematic representation of multiband wireless data transmission between an aircraft and two ground systems, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Conventional air data management and data transmission approaches are typically based on handling different data domains using one central system, such as an onboard network server. The data domains are separated at the software level rather than at the hardware level. However, the hardware link formed between different data domains has inherent security problems. Specifically, the software separation can be more easily compromised than the hardware separation. The physical access to the aircraft hardware is typically well controlled and unlikely to be available. The software is much more accessible especially with new services provided by airlines, such as in flight internet access.

As further described below, different data domains have different security levels depending on tasks associated with these data domains. For example, a passenger information and entertainment services domain (PIESD) needs to be accessible by passengers using, for example, on-board internet, telephone, and other services. The PIESD is an example of a low security domain with an open access. On the other side of the security spectrum is an aircraft control domain (ACD), which includes data used in aircraft operation, such as taking off, flying, and landing. Compromising any data in the ACD is undesirable. With conventional approaches of relying on software separation between data domains, one having access to the PIESD is more likely to break through this separation, maliciously or even unintentionally, than, for example, gaining physical access to hardware components. Furthermore, it may be more difficult to detect the security breach in the software separation than detecting when someone has gained physical access to critical areas and hardware of the aircraft. To reduce the security risk with the software separation, the software is specifically tested and validated resulting in implementation, upgrade, and other delays while increasing associated costs.

Physical separation of aircraft data domains eliminates many security concerns associated with software separation. The physical separation may be viewed as separate hardware networks, each handling a separate data domain. Furthermore, each domain uses separate communication channels for data transmissions between an aircraft and ground systems. For purposes of this disclosure, communication channels may be wireless communication channels (e.g., each channel having a dedicated wavelength range for each data domain) and wired access (e.g., each channel having a separate set of wires, fiber, or the like, for each data domain).

The physical separation may be illustrated with the following example. During landing, an aircraft may need to update its PIESD and ACD, e.g., transmit data sets from the PIESD and ACD on aircraft to two or more ground systems. Based on aircraft hardware configuration, the PIESD may be only physically accessible by a first aircraft communication module (e.g., a cellular modem), while the ACD may be only physically accessible by a second aircraft communication module (e.g., a Wi-Fi router). It should be noted that there may be some physical connections between hardware associated with the PIESD and hardware associated with the ACD. For example, the first aircraft communication module and the second aircraft communication module may be both connected to a multiplexer. Furthermore, a system responsible for the ACD may be configured to control a communication channel used by the PIESD. For example, the ACD may use its own information to form or break the link between the second aircraft communication module and the multiplexer, e.g., by controlling a gate device connecting the second aircraft communication module and the multiplexer.

In the above example, if the cellular communication channel is compromised, it will not impact the ACD because there are no physical data links between the PIESD (or the cellular modem) and the ACD (or the Wi-Fi router). Only when the Wi-Fi communication channel is compromised, the ACD may be impacted. However, in this example, access to the Wi-Fi communication channel may be limited to, for example, airport services and/or may use a particular protocol not (??) available to the general public.

One major challenge with implementing physical separation on aircraft is transmission hardware. Since each data domain has its own communication channel, each channel typically uses a separate set of hardware. Each communication channel may be wired or wireless. Making wired connections to aircraft at an airport may be challenging and a focus is on wireless communication. However, each wireless communication channel conventionally uses a separate antenna, such as an S-band antenna, a C-Band antenna, or an aviation monopole antenna. Each aircraft antenna needs to be positioned on the exterior of an aircraft, which increases drag during flight, increases weight of the aircraft, and requires structural penetration of the aircraft skin. All of these consequences of adding additional antennas are not desirable.

Provided are methods and systems for data transmission using multiple wireless communication channels between an aircraft and one or more ground systems, such that these multiple channels are supported using a single antenna positioned on the exterior of the aircraft, such as a aircraft broadband antenna. Each wireless communication channel is used for independent transmission of data for a data domain. For example, if an aircraft has three data domains, three separate communication channels are used, all supported using the same antenna. The data domains and associated wireless communication channels are physically separated from each other.

For purposes of this description/disclosure, data transmission using multiple independent wireless communication channels may be referred to as multiband wireless communication or, simply, multiband communication. The wireless communication channels use different wavelength ranges. The wavelength differences create physical separation during data transmission. Furthermore, an aircraft uses a separate system for each data domain, which may be referred to as a backbone. The systems are not interconnected besides a connection to a common multiplexer.

The use of a single aircraft antenna for multiple communication channels (as opposed to using a separate antenna for each channel) reduces drag and weight and improves structure integrity of the aircraft. The antenna may be connected to multiple aircraft communication modules, each responsible for a separate communication channel. A multiplexer may be used to combine different RF signals from different communication modules and provide this combined signal to the antenna. For example, one aircraft communication module may be Wi-Fi router, while another aircraft communication module may be a cellular modem. The Wi-Fi router and the cellular modem may be connected to the same antenna using a multiplexer. The Wi-Fi router may establish a Wi-Fi communication channel, while the cellular modem may establish a cellular communication channel, both through the same antenna. Even if the cellular communication channel is compromised, this security breach will not impact the Wi-Fi communication channel or the data domain associated with the Wi-Fi communication channel.

As noted above, each aircraft communication module is responsible for a separate data domain thereby establishing physical separation between data domains during transmission. Each aircraft communication module may be connected to a separate aircraft system responsible for that data domain. A brief description of three aircraft data domains and associated systems is presented below to provide better understanding of various features of this disclosure. One data domain example is an ACD, briefly mentioned above. The ACD's primary functions are to support various operations of the aircraft in a safe manner. The ACD communicates with various high-priority air traffic control (ATC) systems and, in some embodiments, with an aircraft operational control (AOC) system. The ATC and some AOC communications are considered to be the highest priority communications in the airport environment. Conventional ACD off-board communication channels are predominantly analog or non-IP digital. The ACD can be divided into two sub-domains. The first sub-domain is a flight and embedded control system sub-domain used for controlling the aircraft from the flight-deck. The second sub-domain is a cabin core sub-domain, which provides environmental functions dedicated to cabin operations, such as environmental control, passenger address, smoke detection, and the like.

Another data domain example is an Airline Information Services Domain (AISD). The AISD provides general purpose routing, computing, data storage, and communications services for non-essential aircraft applications. The AISD system may include one or more computing platforms, e.g., for executing third party applications and various content, such as applications and content for cabin and/or flight crew use. The AISD can be divided into two sub-domains. The first sub-domain is an administrative sub-domain, which provides operational and airline administrative information to both the flight deck and cabin. The second sub-domain is a passenger support sub-domain, which provides information to support the passengers.

Yet another data domain example is a PIESD, which is briefly mentioned above. The PIESD is used to provide passenger entertainment and network services. The PIESD includes traditional in-flight entertainment systems, passenger device connectivity systems, passenger flight information systems, broadband television or connectivity systems, seat actuator or message system and controls, and the like.

Examples of Data Transmission Systems

FIG. 1 is a schematic illustration of aircraft 110 communicating with two ground systems 140a and 140b, in accordance with some embodiments. Aircraft 110 is equipped with aircraft communication system 120 and aircraft broadband antenna 122. In some embodiments, aircraft broadband antenna 122 is a part of aircraft communication system 120 even though aircraft broadband antenna 122 may have a different physical location than other components of aircraft communication system 120. Specifically, aircraft broadband antenna 122 may be positioned on the exterior of aircraft 110. As noted above, positioning aircraft broadband antenna 122 on the exterior of aircraft 110 provides an increased data transmission in comparison to antennas positioned inside aircraft 110. The aircraft shell may block the RF signal transmitted and received by the interior antennas. Aircraft broadband antenna 122 may be configured to send and receive RF signals to and from ground antennas 141a and 141b. Ground antennas 141a and 141b are parts of ground communication systems 140a and 140b together with ground networks 142a and 142b. Alternatively, a broadband antenna capable of operating within multiple wavelength ranges may be shared by ground systems 140a and 140b.

Communication system 120 may be communicatively coupled to at least two aircraft systems, e.g., first aircraft system 130a and second aircraft system 130b. First aircraft system 130a may only have access to data in a first data domain, while second aircraft system 130b may only have access to data in a second data domain. The second data domain is physically separated from the first data domain as will now be described with reference to FIG. 2A.

Figure 2A:
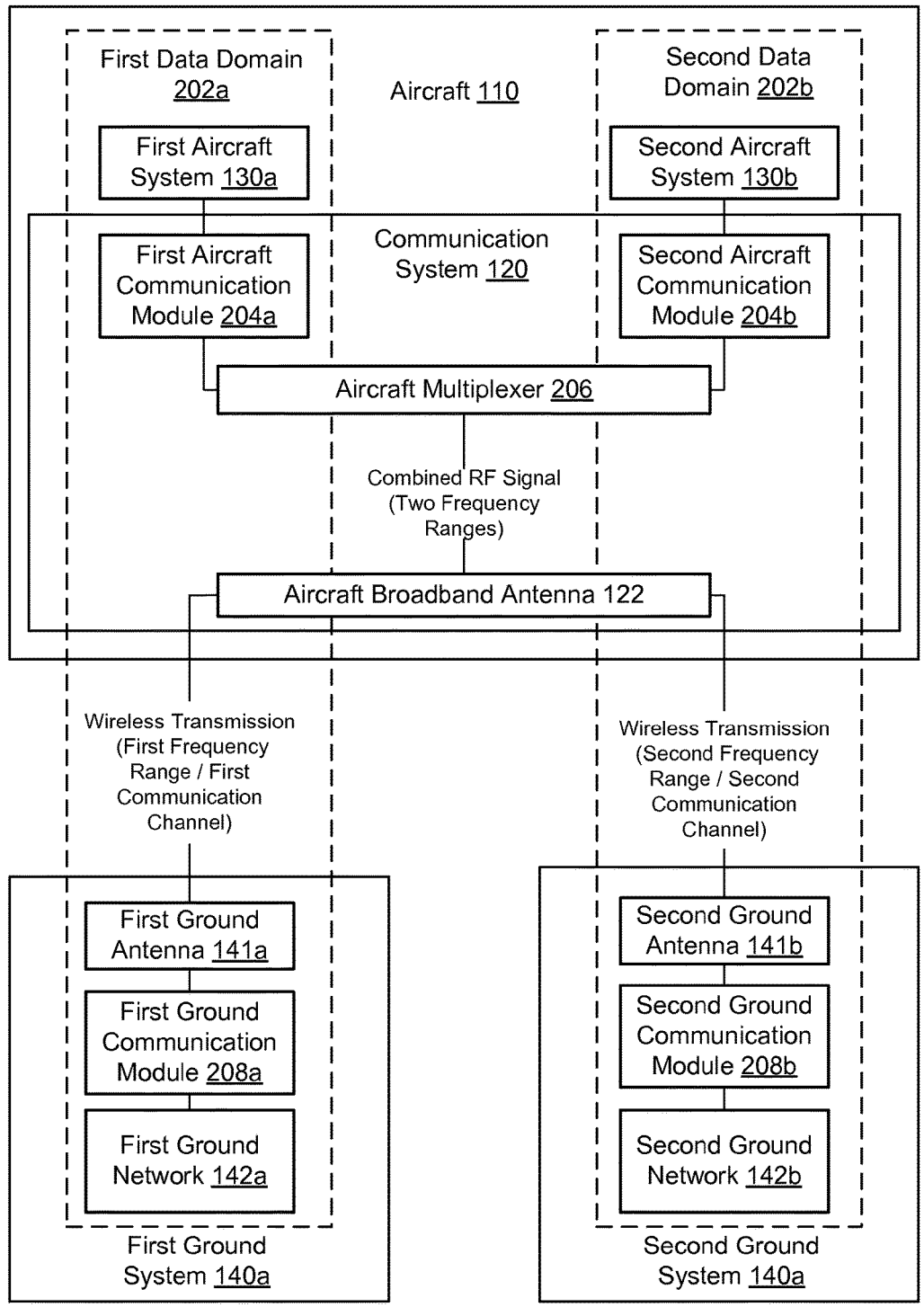
FIG. 2A is a schematic representation of two data domains and various components involved in handling data transmission within these two data domains, in accordance with some embodiments.

FIG. 2A is a schematic illustration of various components of aircraft and ground communication systems and associated communication links to illustrate physical separation between first data domain 202a and second data domain 202b, in accordance with some embodiments. Specifically, communication system 120 of aircraft 110 may include first aircraft communication module 204a and second aircraft communication module 204b. First aircraft communication module 204a is communicatively coupled to first aircraft system 130a, while second aircraft communication module 204b is communicatively coupled to second aircraft system 130b. Each aircraft communication module is responsible for a separate data domain. First aircraft communication module 204a operates within and handles data of first data domain 202a, while second aircraft communication module 204b operates within and handles data of second data domain 202b. It should be noted that first aircraft system 130a is a part of first data domain 202a, while second aircraft system 130b is a part of second data domain 202b. First and second data domains 202a and 202b are physically separated.

Aircraft systems 130a and 130b send and receive various data sets to their respective aircraft communication modules 204a and 204b. When first aircraft communication module 204a receives a data set form first aircraft system 130a, this module 204 creates an RF signal based on this data set for transmission to first ground system 140a. Similarly, when first aircraft communication module 204a receives an RF signal from first ground system 140a or, more specifically, from first ground antenna 141a, then this module 204a generates a data set representing this RF signal and delivers this data set to first aircraft system 130a. Operation of second aircraft communication module 204b may be similar. However, first aircraft communication module 204a and second aircraft communication module 204b may be configured to generate and receive RF signals within different wavelength ranges. For example, first aircraft communication module 204a may be configured to operate within a first wavelength range, while second aircraft communication module 204b may be configured within a second wavelength range, which is different from the first wavelength range. In some embodiments, the first wavelength range does not overlap with the second wavelength range.

Communication system 120 also includes aircraft multiplexer 206 and, in some embodiments, aircraft broadband antenna 122. Aircraft multiplexer 206 may be connected to each of aircraft communication modules 204a and 204b and allows combining different RF signals from these modules 204a and 204b. Operation of multiplexer 206 will be apparent to one having ordinary skills in the art.

Aircraft broadband antenna 122 may transmit and receive RF signals over a broad range of wavelengths that include operating ranges of all aircraft communication modules connected to antenna 122. In some embodiments, aircraft broadband antenna 122 is configured to transmit with a wavelength range of between about 10 kHz and 60 GHz or, more specifically, between about 700 MHz and 6 GHz. While aircraft broadband antenna 122 is viewed as a part of communication system 120, its location may be different from other components of system 120. Specifically, aircraft broadband antenna 122 may be located on the exterior of aircraft to avoid any interference from the skin and other aircraft components.

As shown in FIG. 2A, aircraft broadband antenna 122 may transmit RF signals to first ground antenna 141a and second ground antenna 141b and receive RF signals from these antennas 141a and 141b. First ground antenna 141a may be coupled to first ground communication module 208a and then to first ground network 142a. First ground antenna 141a, first ground communication module 208a, and first ground network 142a may be all parts of first ground system 140a. Second ground antenna 140b may be coupled to second ground communication module 208b and then to second ground network 142b. Second ground antenna 141b, second ground communication module 208b, and second ground network 142b may be all parts of second ground system 140b. In some embodiments, two or more ground communication modules may share the same antenna, which may be a ground antenna.

Figure 2B:
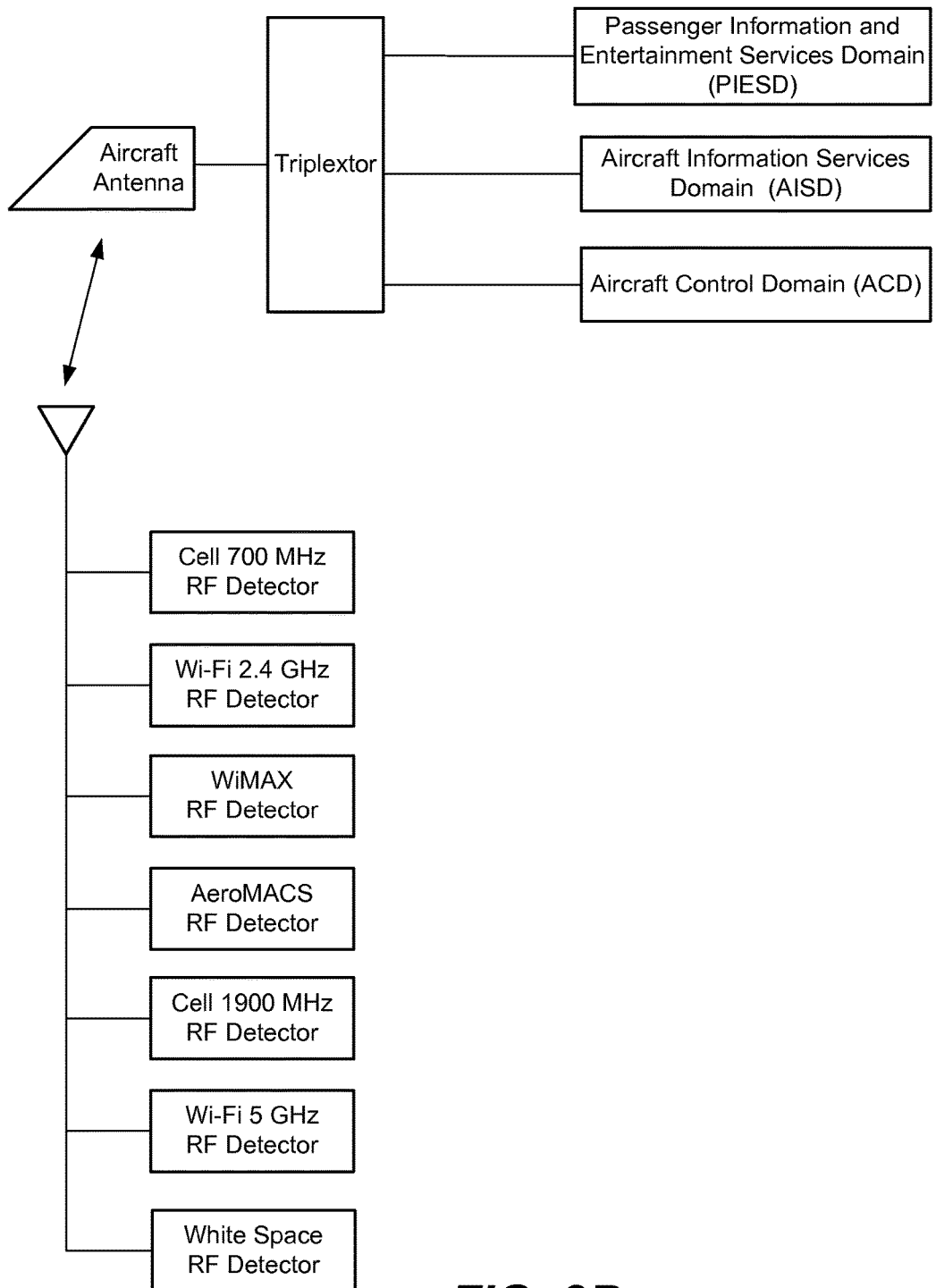
FIG. 2B is a schematic representation of specific components of an aircraft communication system and ground systems, in accordance with some embodiments.

FIG. 2B illustrates specific examples of ground communication modules and data domains, in accordance with some embodiments. The presented examples of ground communication modules include various cell RF detectors (such as cell modems), Wi-Fi detectors (such as Wi-Fi routers), WiMAX detectors, AeroMACS detectors, and White Space Detectors. In general, any wireless communication module may be used. FIG. 2B also illustrates specific examples of data domains, such as PIESD, AISD, and ACD, which are described above in more details. The systems associated with these three data domains are connected to a multiplexor (or, more specifically, to a triplexor), which is in turn connected to an aircraft antenna.

Figure 2C:
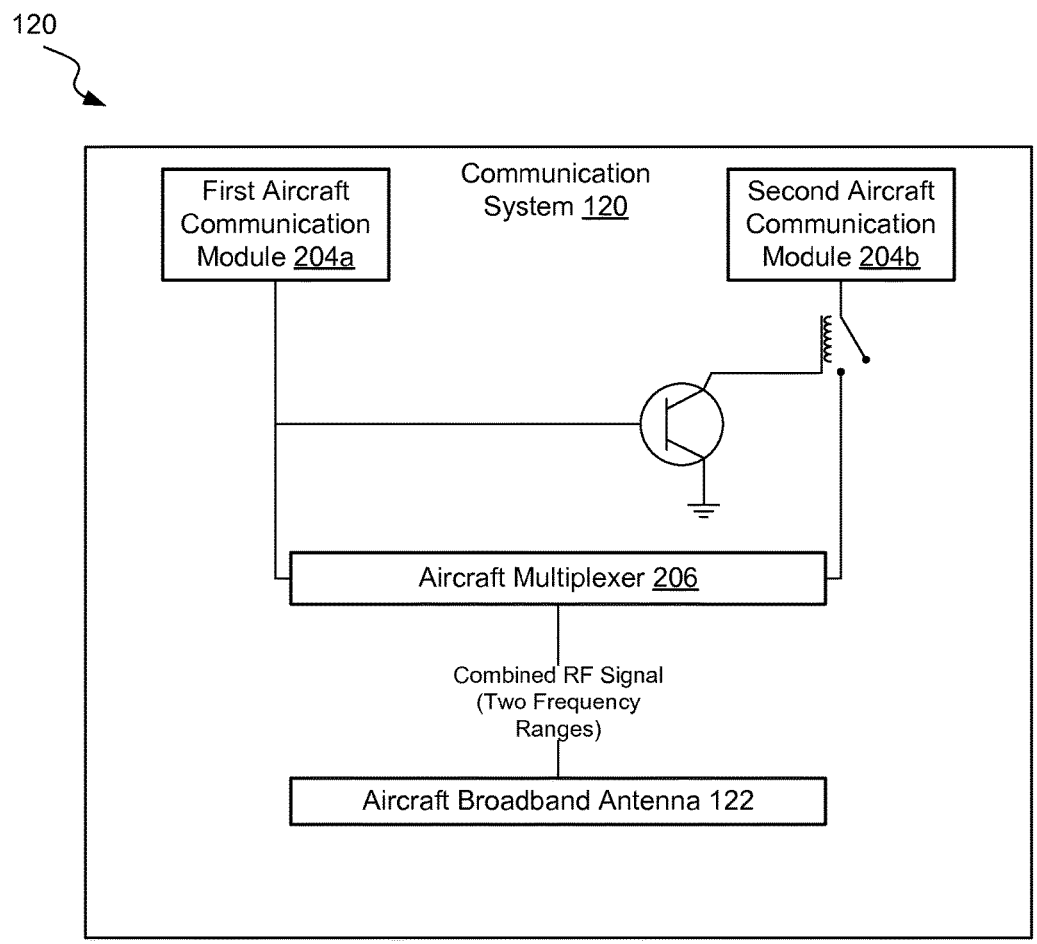
FIG. 2C is a schematic representation of a communication system, in which a connection between one communication module and aircraft multiplexer is conditioned on RF signal received by the other communication module, in accordance with some embodiments.

FIG. 2C is a schematic representation of communication system 120, in which a connection between second communication module 204b and aircraft multiplexer 206 is conditioned on RF signal received by first communication module 204a, in accordance with some embodiments. Specifically, if first communication module 204a does not detect any RF signal corresponding to the communication channel of first communication module 204a, no connection is established between second communication module 204b and aircraft multiplexer 206. In this example, the control function is provided by the hardware components without a need for a controller, and this hardware configuration cannot be compromised without physical access to communication system 120. For example, first communication module 204a may be a cellular modem, while second communication module 204b may be a Wi-Fi router. In this example, unless the cellular signal is received by aircraft broadband antenna 122, the Wi-Fi communication channel cannot be established since the Wi-Fi router remains disconnected from aircraft multiplexer 206. One having ordinary skills in the art would appreciate, the schematic representation in FIG. 2C can be applied to any types of communication modules described in this document, or any other aircraft communication modules. In some embodiments, the connection between second communication module 204b and aircraft multiplexer 206 may be conditioned not only on the presence or absence of the RF signal designated for first communication module 204a, but also on various characteristics of this RF signal, such as strength, security verification, and the like.

Figure 2D:
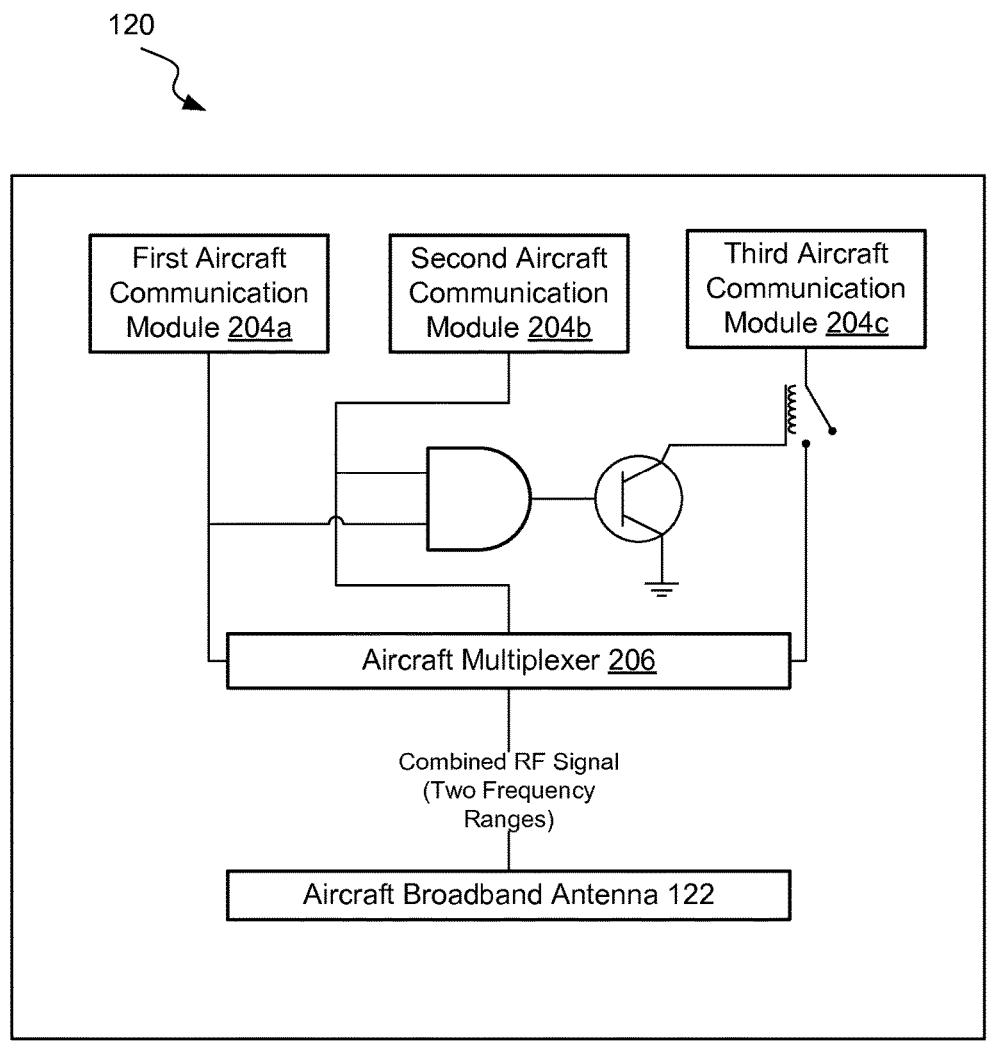
FIG. 2D is a schematic representation of a communication system, in which a connection between one communication module and aircraft multiplexer is conditioned on RF signal received by the two other communication modules, in accordance with some embodiments.

FIG. 2D is a schematic representation of communication system 120, in which a connection between third communication module 204c and aircraft multiplexer 206 is conditioned on RF signal received by first communication module 204a and second communication module 204b, in accordance with some embodiments. In this example, both first communication module 204a and second communication module 204b need to receive RF signals before the connection between third communication module 204c and aircraft multiplexer 206 is established. The RF signals may be received at the same time or at different times depending on the logic set up of hardware components used to implement this example. Similar to FIG. 2C examples described above, the connection may be conditioned on various characteristics of the two RF signals, such as strength, security verification, and the like. Furthermore, one having ordinary skills in the art would appreciate, the schematic representation in FIG. 2D can be applied to any types of communication modules described in this document, or any other aircraft communication modules. For example, cellular and Wi-Fi signals may need to be detected by communication system 120 before connection between a WiMAX router and aircraft multiplexer 206 is established. In another example, SatCom and Wi-Fi signals may need to be detected by communication system 120 before connection between a WiMAX router and aircraft multiplexer 206 is established. In yet another example, cellular and SatCom signals may need to be detected by communication system 120 before connection between a WiMAX router and aircraft multiplexer 206 is established. Furthermore, the differentiation may be made between two types of SatCom signals such as air-SatCom signals and ground-SatCom signals. One type of these SatCom signals may be used to condition the communication using the other type of SatCom signals. The concept presented in FIGS. 2C and 2D may be expanded to systems where any number of different types of RF signals may be used to condition connection in one communication channel. These examples may be collectively referred to as direct hardware logic.

Figure 3:
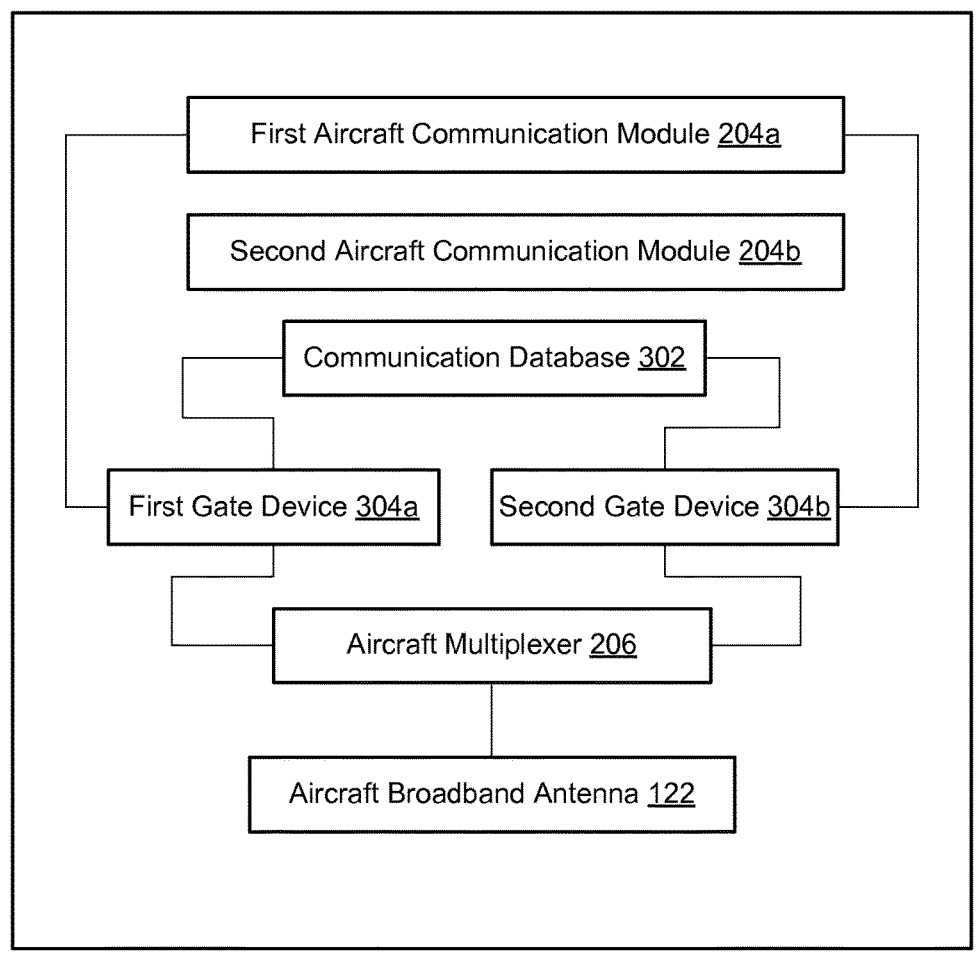
FIG. 3 is a schematic representation of an aircraft communication system, in accordance with some embodiments.

FIG. 3 is a schematic illustration of communication system 120 showing some additional components, such as communication database 302 and gate devices 304a and 304b, in accordance with some embodiments. Gate devices 304a and 304b may be used to connect aircraft communication modules 204a and 204b to aircraft multiplexer 206. For example, first gate device 304a may be used to connect first aircraft communication module 204a to aircraft multiplexer 206, while second gate device 304b may be used to connect second aircraft communication module 204b to aircraft multiplexer 206. In some embodiments, the same gate device may be used to connect multiple aircraft communication modules to aircraft multiplexer 206. For example, first gate device 304a may be used to connect both aircraft communication modules 204a and 204b to aircraft multiplexer 206. In this example, if when first gate device 304a disconnects first aircraft communication module 204a from aircraft multiplexer 206 it will simultaneously disconnect second aircraft communication module 204b from aircraft multiplexer 206 or vice versa. Likewise, if when first gate device 304a connects first aircraft communication module 204a to aircraft multiplexer 206, it will simultaneously connect second aircraft communication module 204b to aircraft multiplexer 206. In some embodiments, a gate device may be used to control the connection between aircraft multiplexer 206 and aircraft broadband antenna 122. In some embodiments, a gate device controlling connection of one aircraft communication module to aircraft multiplexer 206 may be controlled by another aircraft communication module. For example, first gate device 304a may connect first aircraft communication module 204a to aircraft multiplexer 206 and may be controlled by second communication module 204b. When a security threat or other indication is received by second aircraft communication module 204b, second aircraft communication module 204b may break connection between first aircraft communication module 204a and aircraft multiplexer 206.

Gate devices 304a and 304b may be also configured to control these connections based on certain conditions, such as RF energy levels, current availability ground antennas with the operating range of aircraft broadband antenna 122, current security status within the operating range, and the like. Some of these conditions may be stored in communication database 302. For example, communication database 302 may store RF energy ranges for each communication channels (e.g., each communication channel defined by a different wavelength range).

In some embodiments, a programmable logic array (PLA) is used in communication system 120 to implement combinational logic circuits. The PLA may have a set of programmable AND gate planes, which link to a set of programmable OR gate planes. The gate planes can then be conditionally complemented to produce an output. This layout allows for a large number of logic functions to be synthesized in the sum of products (and sometimes product of sums) canonical forms.

In some embodiments, a Generic Array Logic (GAL) is used in communication system 120 to update the logic on gate devices 304a and 304b. This can be implemented, for example, as a response to emerging cyber threats. GAL has eraseable and re-programmable functions allowing for prototyping and design changes.

Examples of Multiband Wireless Transmission Methods

Figure 4:
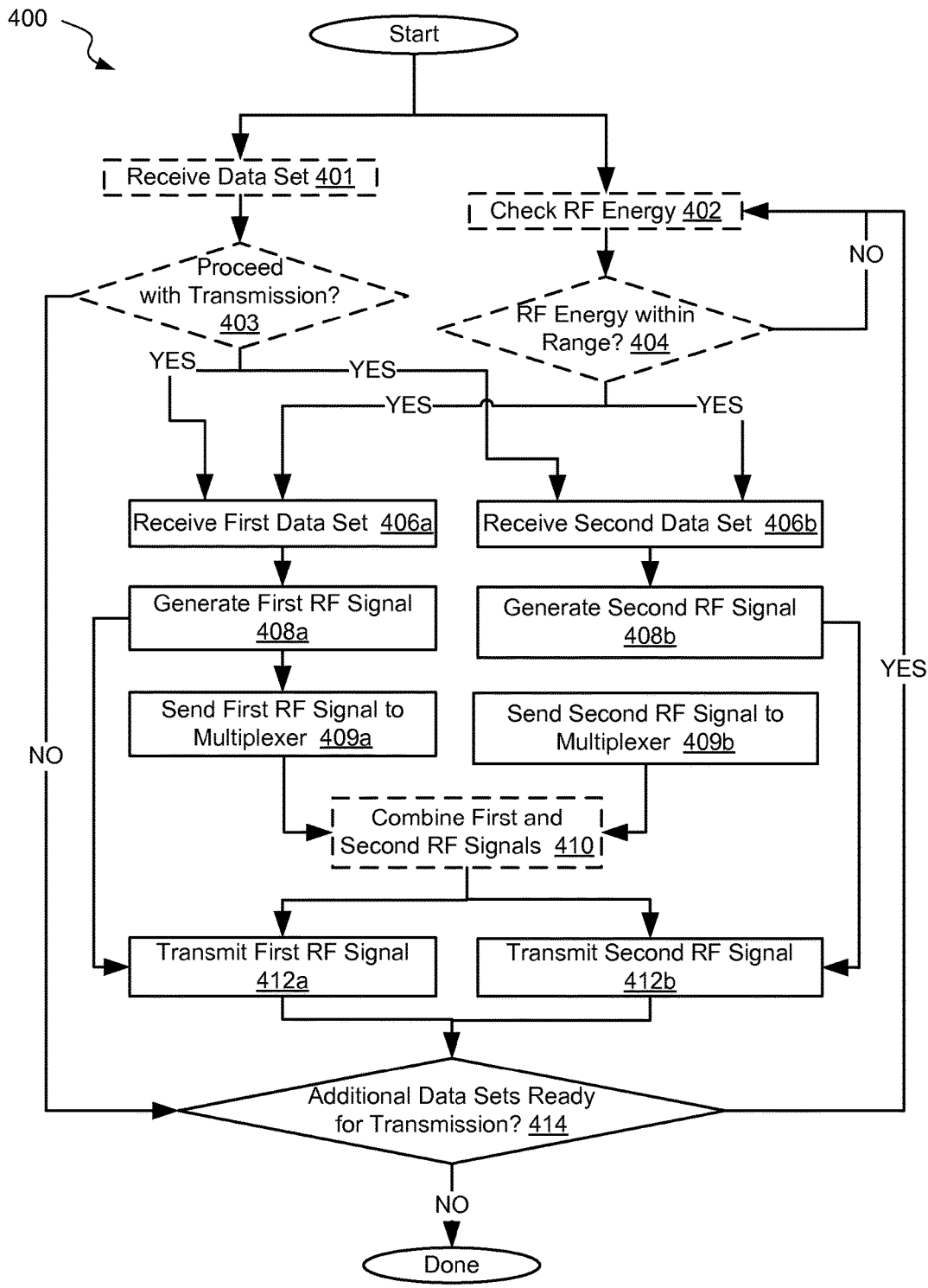
FIG. 4 is a process flowchart corresponding to a method for multiband wireless data transmission between an aircraft and one or more ground external networks, in accordance with some embodiments.

FIG. 4 is a process flowchart corresponding to method 400 for multiband wireless transmission between an aircraft and one or more ground systems, in accordance with some embodiments. Method 400 may involve receiving a first data set at a first aircraft communication module during operation 406a. The first data set may be a part of the first data domain, which is different from the second data domain (discussed below with reference to operation 406b) or any other data domains. More specifically, the first data domain is physically separated from the second data domain. Various examples of data domains are described above.

Each data domain may be managed by a different aircraft system. For example, the first data set may be a part of an aircraft control domain managed by an aircraft control system. As such, the first data set may be received from the aircraft control system. The second data set may be a part of an airline information services domain handled by an airline information services system. As such, the second data set may be received from the airline information services system. Alternatively, the second data set may be a part of a passenger information and entertainment services domain and handled by a passenger information and entertainment services system. As such, the second data set may be received from the passenger information and entertainment services system.

The aircraft system responsible for the first data domain, to which the first data set belongs to, may be responsible for sending the first data set to the first aircraft communication module during operation 406a. In some embodiments, the first aircraft communication module is a part of the aircraft system responsible for the first data domain.

Method 400 may proceed with generating a first RF signal based on the first data set during operation 408a. The first RF signal may be generated using the first aircraft communication module. Various examples of communication modules are described with reference to FIG. 3. It should be noted that, in some embodiments, the first aircraft communication module is capable of generating RF signals only based on data sets of the first data domain. For example, if a data set from another data domain is sent to the first aircraft communication module, the first aircraft communication module will not be able to generate an RF signal. Furthermore, the first aircraft communication module may only handle RF signal received from the first ground system. Even if the RF signal from another ground system is received by the first aircraft communication module, a corresponding data set is not created.

Method 400 may proceed with sending the first RF signal to a multiplexer during operation 409*a*. As noted above with reference to FIGS. 1 and 3, the multiplexer is connected to the aircraft broadband antenna positioned on the exterior of the aircraft. It should be noted that all RF signals generated by aircraft communication modules, as described in method 400, are sent to the same multiplexer and then to the same aircraft broadband antenna. In some embodiments, generation and/or transmission of RF signals may be conditioned on various factors, such as availability of ground systems, security, and such as further described below with reference to operations 401 and 403 and operations 402 and 404.

Operations 406*b*, 408*b*, and 409*b* may be similar to operations 406*a*, 408*a*, and 409*a* described above, but performed by a different aircraft communication module, e.g., a second aircraft communication module. Even though the second aircraft communication module is connected to the same multiplexer as the first aircraft communication module, the second data domain (handled by the second aircraft communication module) is physically separated from the first data domain (handled by the first aircraft communication module). For example, the first aircraft communication module and the second aircraft communication module may use different frequency ranges or other types of physical separation. In some embodiments, the wavelength range of the first RF signal is different from the wavelength range of the second RF signal. More specifically, the wavelength range of the first RF signal may not overlap with the wavelength range of the second RF signal. In some embodiments, the first aircraft communication module is not operable within the wavelength range of the second RF signal. Furthermore, the second aircraft communication module may not be operable within the wavelength range of the first RF signal.

Specifically, operation 406*b* involves receiving a second data set at the second aircraft communication module for transmission to the one or more ground systems. The second data set is a part of a second data domain. Operation 408*b* involves generating a second RF signal on the second data set. The second RF signal is generated using the second aircraft communication module. Operation 409*b* involves sending the second RF signal is provided to the multiplexer.

Operations 406*b*, 408*b*, and 409*b* are performed independently from operations 406*a*, 408*a*, and 409*a*. When operations 409*a* and 409*b* are performed at the same time, the first RF signal and second RF signal may be combined at the multiplexer.

Method 400 may proceed with transmitting the first RF signal from the aircraft broadband antenna to one or more ground systems or, more specifically, to one or more ground antennas during operation 412*a*. In similar operation 412*b*, the second RF signal may be transmitted from the aircraft broadband antenna to the one or more ground antennas. In some embodiments, operation 412*a* (transmitting the first RF signal) at least partially overlaps in time with operation 412*b* (transmitting the second RF signal). In other words, operation 412*a* and 412*b* may be performed at the same time using the same aircraft broadband antenna. In addition to providing security (through the physical separation), this feature may help to increase the transmission bandwidth between the aircraft broadband antenna and one or more ground antennas.

In some embodiments, the first RF signal is transmitted to a first ground antenna, while the second RF signal is transmitted to a second ground antenna different from the first ground antenna. For example, the first ground antenna may be a WiFi antenna, while the second ground antenna is a WiMAX antenna, a cellular antenna, or a SatCom antenna. The first ground antenna may be a part of one ground system, while the second ground antenna may be a part of another ground system. Alternatively, the first RF signal and the second RF signal are transmitted to a same ground antenna of the one or more ground antennas.

While FIG. 4 only illustrates transmission of RF signals corresponding to data sets of two different data domains, i.e., the first data domain and second data domain, one having ordinary skills in the art would understand that the process described above is applicable to any number of data domains. For example, the transmission of RF signals can correspond to include transmitting RF signals for all of the data domains described above, and can further include any other aircraft data domain. Furthermore, receiving of RF signals corresponding to data sets of different data domains is also within the scope of this disclosure.

In some embodiments, method 400 also involves checking RF energy at the aircraft broadband antenna during operation 402. The RF energy checking may be performed to ensure that RF signals are not transmitted when an appropriate ground antenna(s) or system(s) is not available. For example, the aircraft system executing various operations of method 400 may not be aware of local and current availability of ground antennas.

Operation 402 may be performed for each aircraft communication module involved in method 400. In other words, RF energy may be checked for each aircraft communication module involved in method 400 or, more specifically, for the wavelength range of RF signals generated by each aircraft communication module. Transmission of each aircraft communication module RF signal may be conditioned on the corresponding ground antenna or system RF energy being within a certain range (decision block 404). For example, prior to transmitting the first RF signal, method 400 involves checking a first RF energy at the aircraft broadband antenna. The first RF energy corresponds to the wavelength range of the first RF signal. The transmission of the first RF signal is conditioned on the first RF energy being within a first range. If the first RF energy is within the range, then the first RF signal is transmitted. Alternatively, if the first RF energy is not within the range, then the first RF signal is not transmitted. In some embodiments, if RF energy is not within the range for an RF signal corresponding to one data domain, then RF signals for one or more other data domains are not transmitted as well.

Operations 402 and 404 may be performed at any time prior to operations 412*a* and 412*b*. In some embodiments, operations 402 and 404 are performed after operations 408*a* and 408*b*, in which case RF signals are generated regardless of RF energy at the aircraft broadband antenna. For example, the first aircraft communication module is connected to the multiplexer using a gate device. The gate device may be operable to connect the first aircraft communication module to the multiplexer or to disconnect the first aircraft communication module from the multiplexer depending on the energy detected at the aircraft broadband antenna as, for example, described above. Thus, the gate device can control whether an RF signal is transmitted by the aircraft broadband antenna in response to, for example, the RF energy observed.

In some embodiments, method 400 may involve receiving one or more data sets indicating current availability of at least one of the one or more ground antennas within the operating range of the aircraft broadband antenna, current security status within the operating range of the aircraft broadband antenna, or some other information that can be used to condition data transmission. These data sets may be received during operation 401 and conditions are checked during operation 403. Specifically, method 400 may involve receiving a third data set at the first aircraft communication module. The third data set may indicate current availability of at least one of the one or more ground antennas or system within the operating range of the aircraft broadband antenna. The third data set may indicate current availability of the first ground communication system. Transmission of the second RF signal may be conditioned on this information, i.e., current availability of the at least one of the one or more ground antennas within the operating range. In some embodiments, operation 401 may be a part of determining availability of the first ground system. The third data set may be received from a communication database of the aircraft as described above with reference to FIG. 3. Alternatively, the third data set may be received by the second aircraft communication module from the second ground system based while the aircraft is in the current location. The third data set may be used to control a connection between the first aircraft communication module and the multiplexer. Specifically, the third data set is used to control operation of a first gate device connecting first aircraft communication module and the multiplexer. In some embodiments, the third data set is used for selecting information for the first data set. For example, the third data set may indicate that the first ground communication system is available but transmission to and from this system may be subject to a certain risk because another communication system is not available, interference signals are present, too many ground communication systems are available, general security threat, or some other factors. In some embodiments, the third data set includes an encryption key for encrypting information of the first data set.

In the same or other embodiments, method 400 may involve receiving a fourth data set at the first aircraft communication module. The fourth data set may indicate the current security status within the operating range of the aircraft broadband antenna. Transmission of the second RF signal may be conditioned on the current security status within the operating range aircraft broadband antenna.

In some embodiments, information used to condition transmission of RF signals is available within the communication database of the aircraft. For example, transmission of the second RF signal may be conditioned on the availability of the one or more ground antennas for the present location of the aircraft. This availability may be provided from the communication database.

Examples of Aircraft

Figure 5:
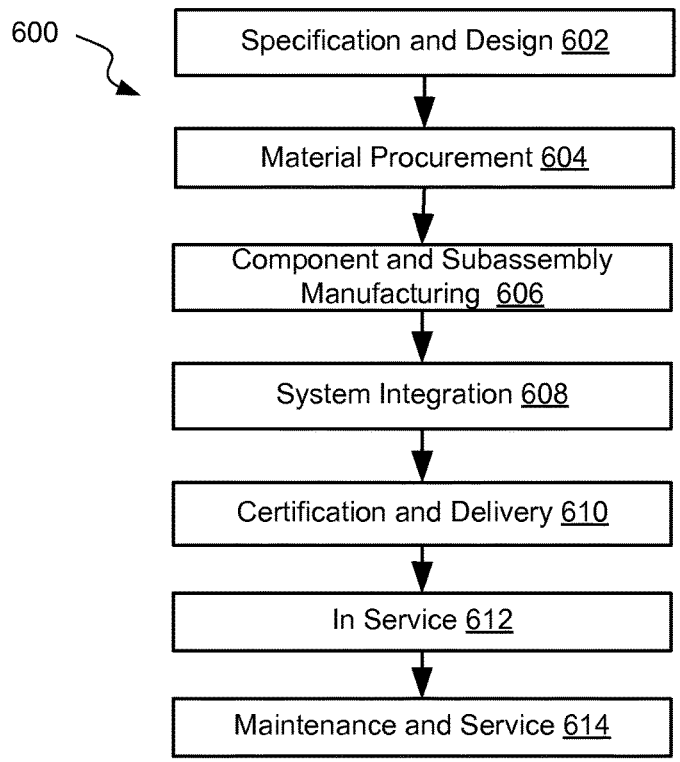
FIG. 5 is a process flowchart reflecting key operations in the life cycle of an aircraft from early stages of manufacturing and to entering service, in accordance with some embodiments.

An aircraft manufacturing and service method 600 shown in FIG. 5 and an aircraft 630 shown in FIG. 6 will now be described to better illustrate various features of processes and systems presented herein. During pre-production, aircraft manufacturing and service method 600 may include specification and design 602 of aircraft 630 and material procurement 604. The production phase involves component and subassembly manufacturing 606 and system integration 608 of aircraft 630. Thereafter, aircraft 630 may go through certification and delivery 610 in order to be placed in service 612. While in service by a customer, aircraft 630 is scheduled for routine maintenance and service 614 (which may also include modification, reconfiguration, refurbishment, and so on). While the embodiments described herein relate generally to servicing of commercial aircraft, they may be practiced at other stages of the aircraft manufacturing and service method 600.

Each of the processes of aircraft manufacturing and service method 600 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of vendors, subcontractors, and suppliers; and an operator may be an airline, leasing company, military entity, service organization, and so on.

Figure 6:
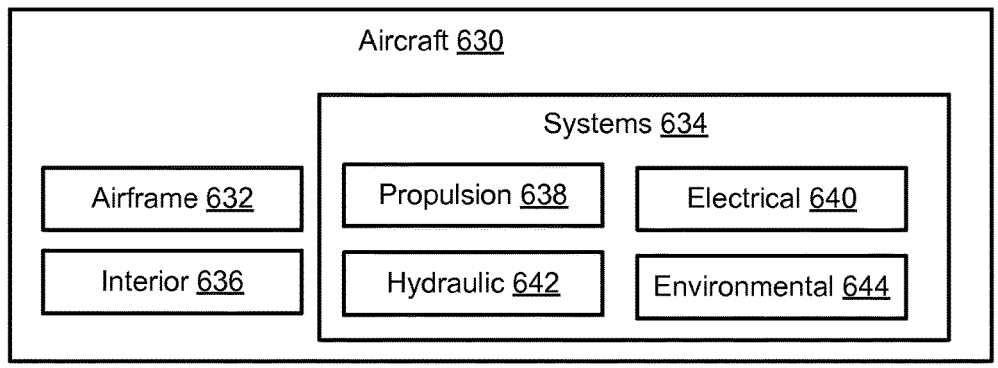
FIG. 6 is a block diagram illustrating various key components of an aircraft, in accordance with some embodiments.

As shown in FIG. 6, aircraft 630 produced by aircraft manufacturing and service method 600 may include airframe 632, interior 636, and multiple systems 634 and interior 636. Examples of systems 634 include one or more of propulsion system 638, electrical system 640, hydraulic system 642, and environmental system 644. Any number of other systems may be included in this example. Although an aircraft example is shown, the principles of the disclosure may be applied to other industries, such as the automotive industry.

Apparatus and methods embodied herein may be employed during any one or more of the stages of aircraft manufacturing and service method 600. For example, without limitation, components or subassemblies corresponding to component and subassembly manufacturing 606 may be fabricated or manufactured in a manner similar to components or subassemblies produced while aircraft 630 is in service.

Also, one or more apparatus embodiments, method embodiments, or a combination thereof may be utilized during component and subassembly manufacturing 606 and system integration 608, for example, without limitation, by substantially expediting assembly of or reducing the cost of aircraft 630. Similarly, one or more of apparatus embodiments, method embodiments, or a combination thereof may be utilized while aircraft 630 is in service, for example, without limitation, to maintenance and service 614 may be used during system integration 608 and/or maintenance and service 614 to determine whether parts may be connected and/or mated to each other.

Examples of Controller Computer Systems

Figure 7:
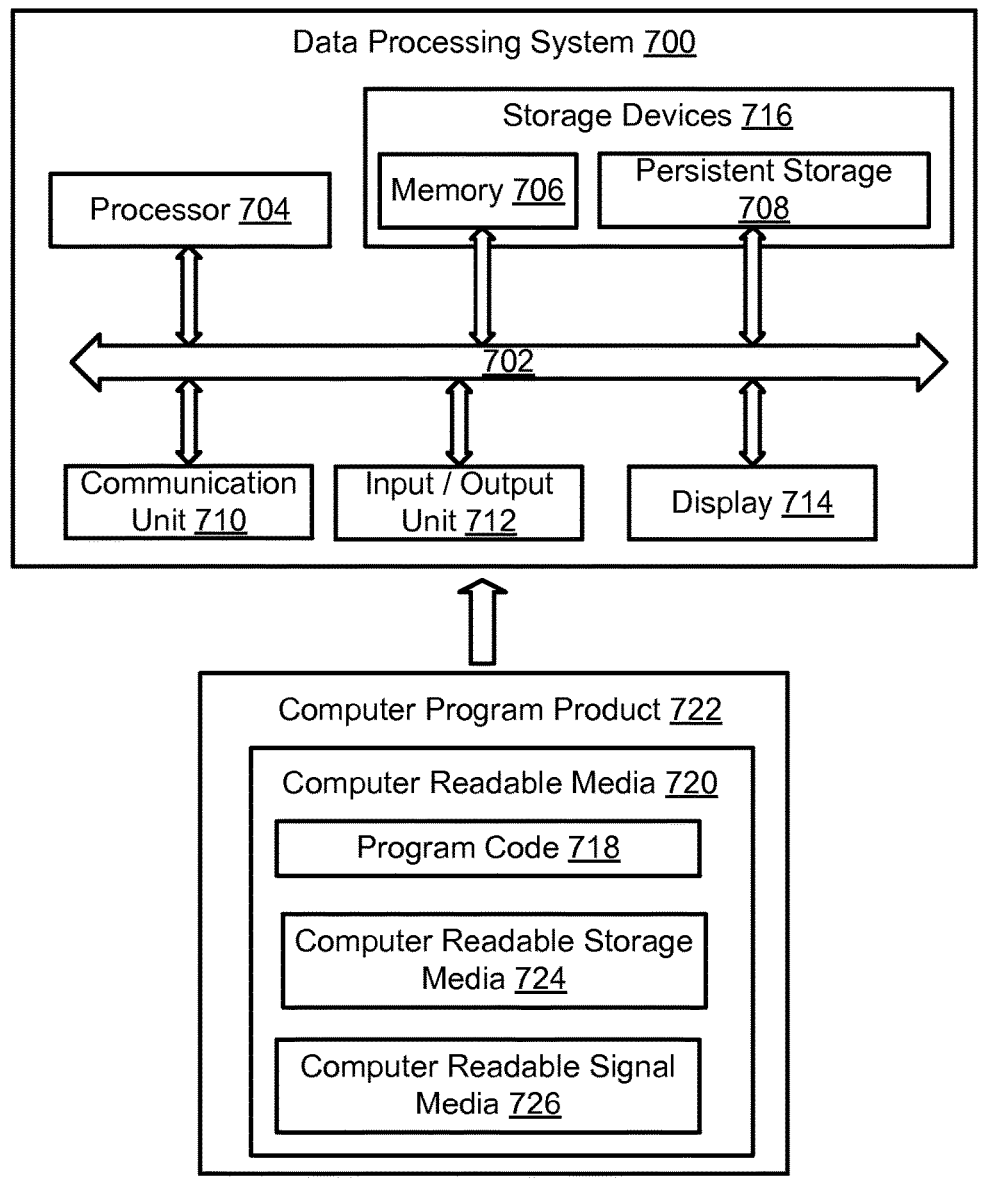
FIG. 7 is a block diagram illustrating a data processing system, in accordance with some embodiments.

Turning now to FIG. 7, an illustration of a data processing system 700 is depicted in accordance with some embodiments. Data processing system 700 may be used to implement one or more computers used in a controller or other components of various systems described above. In some embodiments, data processing system 700 includes communications framework 702, which provides communications between processor unit 704, memory 706, persistent storage 708, communications unit 710, input/output (I/O) unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these illustrative examples. Memory 706, in these examples, may be, for example, a random access memory or any other suitable volatile or non-volatile storage device. Persistent storage 708 may take various forms, depending on the particular implementation. For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transmitted to data processing system 700 for execution by processor unit 704. Program code 718 and computer readable media 720 form computer program product 722 in these illustrative examples. In one example, computer readable media 720 may be computer readable storage media 724 or computer readable signal media 726.

In these illustrative examples, computer readable storage media 724 is a physical or tangible storage device used to store program code 718 rather than a medium that propagates or transmits program code 718.

Alternatively, program code 718 may be transmitted to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications channels, such as wireless communications channels, optical fiber cable, coaxial cable, a wire, and/or any other suitable type of communications channel.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code 718.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

The invention claimed is:

1. A method for multiband wireless data transmission between an aircraft and one or more ground systems, the method comprising:

determining a first RF energy at an aircraft broadband antenna, the first RF energy corresponding to a first ground system;

receiving a first data set at a first aircraft communication module,
wherein the first aircraft communication module is connected to an aircraft control domain (ACD) system and the first data set is received from the ACD system;

generating a first radio frequency (RF) signal based on the first data set,
wherein the first RF signal is generated using the first aircraft communication module, and sending the first RF signal to a multiplexer connected to the aircraft broadband antenna positioned on an exterior of the aircraft, if the first RF energy is within a first RF energy range corresponding to the first ground system;

transmitting the first RF signal using the aircraft broadband antenna to the first ground system, if the first RF signal is sent to the multiplexer;

determining a second RF energy at the aircraft broadband antenna, the second RF energy corresponding to a second ground system;

receiving a second data set at a second aircraft communication module,
wherein the second aircraft communication module is connected to a passenger information and entertainment services domain (PIESD) system and the second data set is received from the PIESD system,
wherein the first aircraft communication module and the second aircraft communication module operate at different security levels and are physically separated,
wherein the first data set and the second data set are physically separated at the aircraft thereby maintaining the different security levels of the first aircraft communication module and the second aircraft communication module such that the first data set is not accessible to the second aircraft communication module and such that the second data set is not accessible to the first aircraft communication module;

generating a second RF signal based on the second data set,
wherein the second RF signal is generated using a second aircraft communication module,
sending the second RF signal to the multiplexer, if the second RF energy is within a second RF energy range corresponding to the second ground system; and
transmitting the second RF signal using the aircraft broadband antenna to a second ground system different from the first ground system, if the second RF signal is sent to the multiplexer,
wherein a wavelength range of the first RF signal is different from a wavelength range of the second RF signal thereby maintaining physical separation between the first data set and the second data set during wireless transmission and allowing for the first RF signal to be transferred simultaneously with the second RF signal,
wherein the second aircraft communication module is not operable within the wavelength range of the first RF signal.

2. The method of claim 1, further comprising receiving a third data set, wherein the third data set comprises the first RF energy range energy and the second RF energy range.

3. The method of claim 2, wherein the third data set is received from a communication database of the aircraft.

4. The method of claim 2, wherein the third data set is based on the current location of the aircraft.

5. The method of claim 2, wherein the third data set is used to control a connection between the first aircraft communication module and the multiplexer.

6. The method of claim 5, wherein the first RF energy range energy of the third data set is used to control operation of a first gate device connecting first aircraft communication module and the multiplexer.

7. The method of claim 2, wherein the third data set is used for selecting information for the first data set.

8. The method of claim 2, wherein the third data set comprises an encryption key for encrypting information of the first data set.

9. The method of claim 1, wherein, if the first RF energy is not within the first RF energy range, sending a fourth data set to the second ground communication module, and wherein the fourth data set indicated that the first ground system is not available.

10. The method of claim 1, wherein the wavelength range of the first RF signal does not overlap with the wavelength range of the second RF signal.

11. The method of claim 1, wherein transmitting the first RF signal at least partially overlaps in time with transmitting the second RF signal.

12. The method of claim 1, wherein an antenna of the first ground system is a WiFi antenna, and wherein an antenna of the second ground system is a WiMAX antenna, a cellular antenna, or a SatCom.

13. A system for multiband wireless data transmission between an aircraft and one or more ground systems, the system comprising:
a first aircraft communication module configured to operate within a first wavelength operating range and generate a first radio frequency (RF) signal based on a first data set,
wherein the first aircraft communication module is connected to an aircraft control domain (ACD) system and the first data set is received from the ACD system;
a second aircraft communication module configured to operate within a second wavelength operating range to generate a first radio frequency (RF) signal based on a first data set,
wherein the second aircraft communication module is connected to a passenger information and entertainment services domain (PIESD) system and the second data set is received from the PIESD system,
wherein the first aircraft communication module and the second aircraft communication module operate at different security levels,
wherein the first data set and the second data set are physically separated at the aircraft thereby maintaining the different security levels of the first aircraft communication module and the second aircraft communication module such that the first data set is not accessible to the second aircraft communication module and such that the second data set is not accessible to the first aircraft communication module,
wherein the second wavelength operating range does not overlap with the first wavelength operating range thereby maintaining physical separation between the first data set and the second data set during wireless transmission and allowing for the first RF signal to be transferred simultaneously with the second RF signal, and
wherein the second aircraft communication module is not operable within the wavelength range of the first RF signal;
a communication database comprising a first RF energy range and a second RF energy range for each of multiple locations;
a multiplexer connected to the first aircraft communication module using a first gate device and to the second aircraft communication module using a second gate device,
wherein the first gate device is configured to control sending of the first RF signal from the first aircraft communication module to the multiplexer based on a first RF energy at the aircraft broadband antenna being within the first RF energy range,
wherein the multiplexer is configured to combine RF signals from the first aircraft communication module in the first wavelength operating range and from the second aircraft communication module in the second wavelength operating range; and
a aircraft broadband antenna positioned on exterior of the aircraft,
wherein the broadband antenna is connected to the multiplexer and configured to transmit the RF signals in the first wavelength operating range and the second wavelength operating range to the at least two ground systems different from each other
wherein the first gate device is configured to control sending of the first RF signal from the first aircraft communication module to the multiplexer based on a first RF energy at the aircraft broadband antenna being within the first RF energy range, and
wherein the second gate device is configured to control sending of the second RF signal from the second aircraft communication module to the multiplexer based on a second RF energy at the aircraft broadband antenna being within the second RF energy range.

14. The system of claim 13, wherein the communication database is configured to be updated by the first aircraft communication module.

15. A computer program product, comprising a computer usable medium having a computer readable program code embodied therein, said computer readable program code adapted to be executed to implement a method for multiband wireless data transmission between an aircraft and one or more ground systems, the method comprising:

determining a first RF energy at an aircraft broadband antenna, the first RF energy corresponding to a first ground system;

receiving a first data set at a first aircraft communication module,
wherein the first aircraft communication module is connected to an aircraft control domain (ACD) system and the first data set is received from the ACD system;

generating a first radio frequency (RF) signal based on the first data set,
wherein the first RF signal is generated using the first aircraft communication module, and sending the first RF signal to a multiplexer connected to an aircraft broadband antenna positioned on an exterior of the aircraft, if the first RF energy is within a first RF energy range corresponding to the first ground system;

transmitting the first RF signal using the aircraft broadband antenna to the first ground system if the first RF signal is sent to the multiplexer;

determining a second RF energy at the aircraft broadband antenna, the second RF energy corresponding to a second ground system;

receiving a second data set at a second aircraft communication module,
wherein the second aircraft communication module is connected to a passenger information and entertainment services domain (PIESD) system and the second data set is received from the PIESD system,
wherein the first aircraft communication module and the second aircraft communication module operate at different security levels,
wherein the first data set and the second data set are physically separated at the aircraft thereby maintaining the different security levels of the first aircraft communication module and the second aircraft communication module such that the first data set is not accessible to the second aircraft communication module and such that the second data set is not accessible to the first aircraft communication module;

generating a second RF signal based on the second data set,
wherein the second RF signal is generated using a second aircraft communication module, sending the second RF signal to the multiplexer, if the second RF energy is within a second RF energy range corresponding to the second ground system; and transmitting the second RF signal using the aircraft broadband antenna to a second ground system different from the first ground system, if the second RF signal is sent to the multiplexer,
wherein a wavelength range of the first RF signal is different from a wavelength range of the second RF signal thereby maintaining physical separation between the first data set and the second data set during wireless transmission and allowing for the first RF signal to be transferred simultaneously with the second RF signal,
wherein the second aircraft communication module is not operable within the wavelength range of the first RF signal.

16. The method of claim 1, wherein the first aircraft communication module and the second aircraft communication module are parts of separate hardware networks of the aircraft.

17. The method of claim 1, wherein the ACD is not accessible by the second aircraft communication module.

18. The method of claim 1, wherein the ACD controls the second aircraft communication module.

19. The method of claim 1, wherein sending the first RF signal and sending the second RF signal are performed independently from each other.

20. The method of claim 1, wherein the first aircraft communication is connected only to the ACD system.

* * * * *